United States Patent
Barrera Munoz et al.

(10) Patent No.: US 10,046,720 B2
(45) Date of Patent: Aug. 14, 2018

(54) VEHICLE-INTEGRATED REACHING AID

(71) Applicant: Ford Global Technologies, LLC, Dearborn, MI (US)

(72) Inventors: Dario Jesus Barrera Munoz, Tlalnepantla (MX); Juan Manuel Gallardo Almiray, Queretaro (MX); Sergio Alberto Vega Velazquez, Mexico (MX)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/351,824

(22) Filed: Nov. 15, 2016

(65) Prior Publication Data

US 2018/0134235 A1 May 17, 2018

(51) Int. Cl.
*B60P 3/00* (2006.01)
*B60R 11/06* (2006.01)
*B25J 1/04* (2006.01)
*B60R 11/00* (2006.01)

(52) U.S. Cl.
CPC .................. *B60R 11/06* (2013.01); *B25J 1/04* (2013.01); *B60R 2011/0036* (2013.01); *B60R 2011/0045* (2013.01)

(58) Field of Classification Search
CPC ............. B60R 11/06; B60R 2011/0036; B60R 2011/0045; B25J 1/04
See application file for complete search history.

(56) References Cited

U.S. PATENT DOCUMENTS

| | | | |
|---|---|---|---|
| 8,777,287 B2 | 7/2014 | Ludwig et al. | |
| 2004/0142232 A1* | 7/2004 | Risca | B60H 1/00514 |
| | | | 429/100 |
| 2005/0150922 A1 | 7/2005 | Halpern | |
| 2006/0102671 A1* | 5/2006 | Fitzpatrick | B60R 5/048 |
| | | | 224/543 |
| 2008/0217938 A1* | 9/2008 | Sullivan | A47F 13/06 |
| | | | 294/210 |
| 2008/0257923 A1* | 10/2008 | DalPizzol | B60R 7/02 |
| | | | 224/281 |
| 2010/0102583 A1 | 4/2010 | McCoy et al. | |
| 2014/0077518 A1* | 3/2014 | Preisler | B60N 2/6009 |
| | | | 296/37.5 |
| 2015/0151429 A1* | 6/2015 | Thibodeaux | B25J 1/04 |
| | | | 294/104 |

FOREIGN PATENT DOCUMENTS

DE             4217139 A1     11/1993

* cited by examiner

*Primary Examiner* — Lori L Lyjak
(74) *Attorney, Agent, or Firm* — Brooks Kushman P.C.

(57) ABSTRACT

A vehicle includes trim panel walls defining a cargo compartment. At least one trim panel wall has an indented portion defining a recess. A reaching aid is disposed within the recess in a stored configuration, and is selectively removable from the recess.

15 Claims, 3 Drawing Sheets

VEHICLE-INTEGRATED REACHING AID

TECHNICAL FIELD

This disclosure relates to a reaching aid, and more particularly, to a vehicle-integrated reaching aid selectively removable from the vehicle.

BACKGROUND

Many vehicles are provided with cargo space, typically at the rear of the vehicle. Some vehicles, particularly cars, have extended trunk space. In some instances, a user may have difficulty accessing the full interior of the trunk space while standing next to the trunk. This may be particularly true in the case of a relatively short adult or a child reaching into a relatively deep trunk. To access the full interior, the user may partially enter the trunk or may even climb into the trunk. Such actions often pose significant safety concerns, such as the user losing their balance or becoming trapped within the trunk.

SUMMARY

This disclosure provides approaches for retrieving out-of-reach objects from a trunk of a vehicle. A vehicle includes trim panel walls defining a cargo compartment. At least one trim panel wall has an indented portion defining a recess. A reaching aid is disposed within the recess in a stored configuration, and is selectively removable from the recess.

A reaching aid for storage in a trim panel wall of a vehicle includes a handle portion, an object engaging portion, and an elongated body portion extending in a generally longitudinal direction between the handle portion and the object engaging portion. The elongated body portion is adapted to form an interference fit with the trim panel wall of the vehicle in a stored configuration.

A method for handling an elongated reaching aid includes inserting at least a portion of the elongated reaching aid within an indented portion of a trim panel wall of a vehicle. The method further includes engaging the trim panel wall with the elongated reaching aid to provide an interference-fit between the elongated reaching aid and the trim panel wall. In some approaches, the method further includes pressing at least a portion of the elongated reaching aid into an extended indented portion of the indented portion to rotate the elongated reaching aid relative to the indented portion. The method may further include removing the elongated reaching aid from the indented portion of the trim panel wall.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
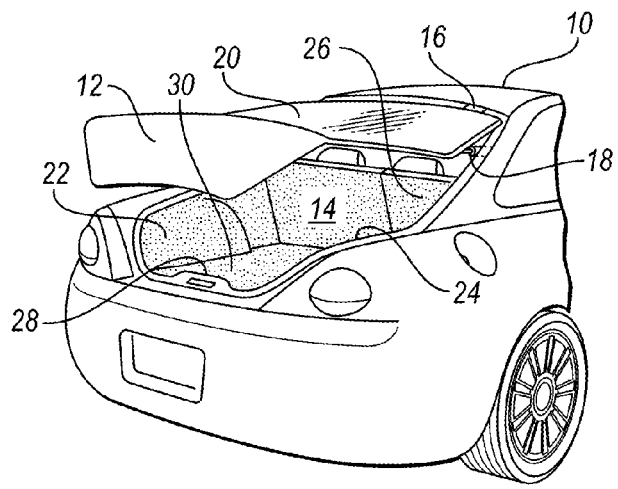
FIG. 1 is a rear perspective view of a cargo space of a vehicle.

Referring to FIG. 1 a motor vehicle 10 is provided with a cargo access door such as a lift-gate 12. The lift-gate 12 may be pivotally mounted by hinge means 16 at the rear near the roof of the vehicle 10. Various approaches may be used to secure the lift-gate 12 in an open position, such as gas-cylinders 18 that are typically mounted to the vehicle 10 and to the lift-gate 12. The lift-gate 12 typically includes a rear window 20.

The lift-gate 12 may be opened to expose the cargo space 14 of the vehicle 10. The cargo space, often referred to as a trunk, may be defined by interior walls such as opposing side walls 22, 24, a forward wall 26, a rear wall 28, and a bottom wall 30. In some approaches, shown in FIG. 1, the forward wall 26 is the backside of a rear bench-style passenger seat. In other approaches, the forward wall 26 is a trim panel wall. The opposing side walls 22, 24, rear wall 28, and bottom wall 30 are preferably trim panel walls and may be formed from polypropylene, for example. The walls defining the cargo space 14 may include overlaying fabric, or may be exposed body paneling.

Figure 2:
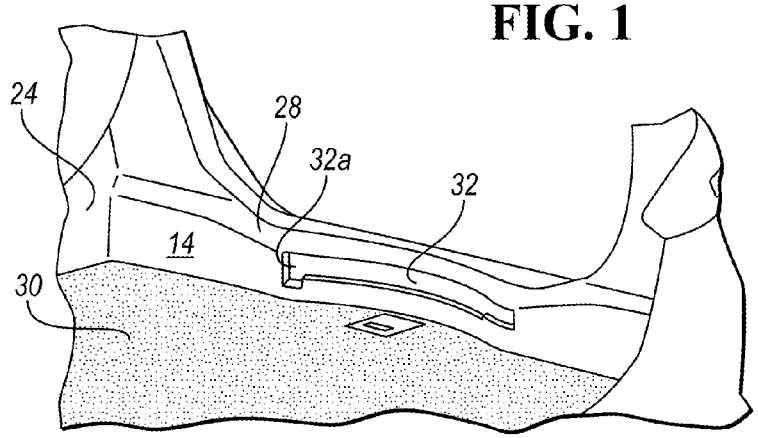
FIG. 2 is a perspective from the interior of a cargo space of a vehicle having a recess for receiving a reaching aid.

Referring to FIG. 2, at least one trim panel wall includes an indented portion 32 defining a recess. In a preferred approach, the rear wall 28 (which in some vehicles may be referred to as a scuff plate) includes the indented portion 32. The indented portion 32 is sized and adapted to receive an elongated reaching aid. In a preferred approach, at least a portion of the indented portion 32 defines is an extended indented portion 32a that defines an extended recess, as discussed in greater detail elsewhere herein.

Figure 3:
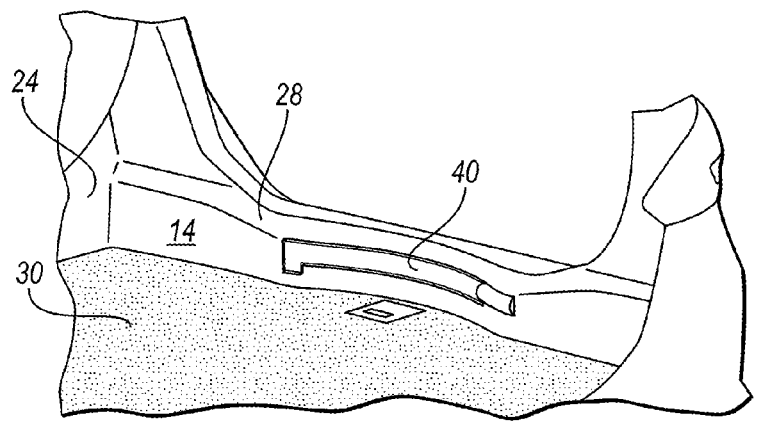
FIG. 3 is a perspective from the interior of the cargo space of the vehicle of FIG. 2 having a reaching aid stored in the recess.

Referring to FIG. 3, a reaching aid 40 is sized and adapted to be stored in a recess (e.g., as defined by the indented portion 32 of FIG. 2). The reaching aid 40 is preferably maintained in the recess through an interference fit (e.g., snap-fit, friction-fit, etc.). In this way, the indented portion 32 may be provided with protrusions adapted to receive the reaching aid 40. In one approach, the protrusions plastically deform when the reaching aid 40 is inserted in the recess. In another approach, movable components such as springs or bearings may be used to maintain the reaching aid 40 in the recess. In still other approaches, protrusions or movable components may be integrated in the reaching aid 40 to provide an interference fit with the indented portion when the reaching aid 40 is inserted in the recess.

Figure 4:
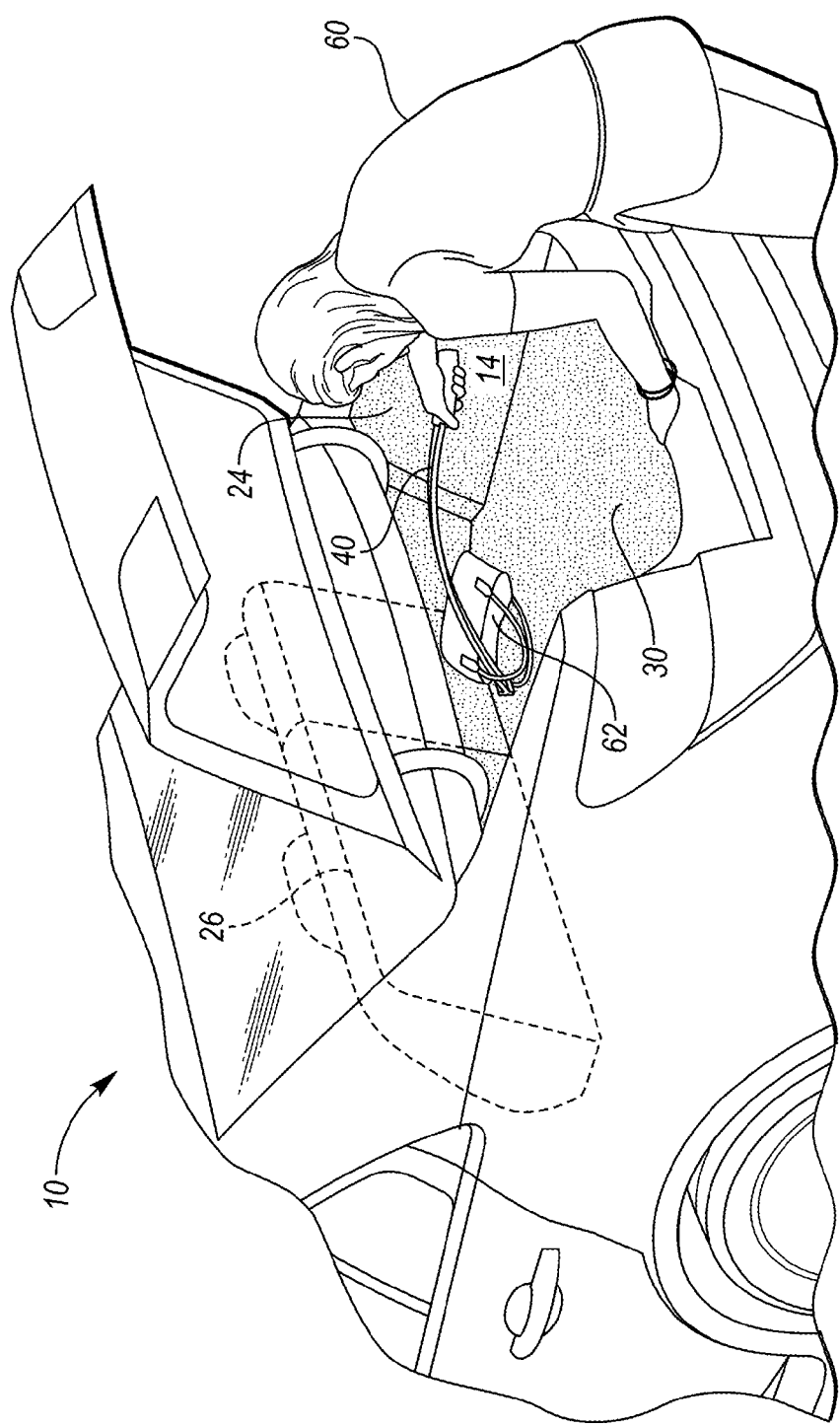
FIG. 4 is perspective view of the cargo space of the vehicle of FIG. 2 showing the reaching aid in use.

With reference now to FIG. 4, a user 60 may operate the reaching aid 40 to access an object 62 located deep within the cargo space 14 of a vehicle 10. In this regard, the reaching aid 40 is preferably an elongated reaching aid 40 having a longitudinal length of at least 10 inches. More particularly, the reaching aid 40 may have a longitudinal length in a range of approximately 20 to 24 inches, and preferably, approximately 22 inches. The longitudinal length of the reaching aid 40 may correspond to one or more of the size of the cargo space 14 and the trim wall panel in which the reaching aid 40 is stored.

Figure 5:
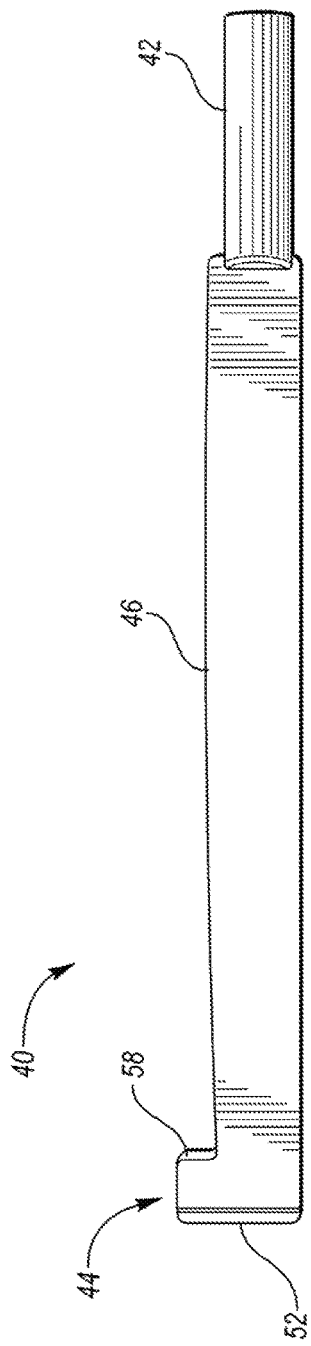
FIG. 5 is a top plan view of a reaching aid.
Figure 6:
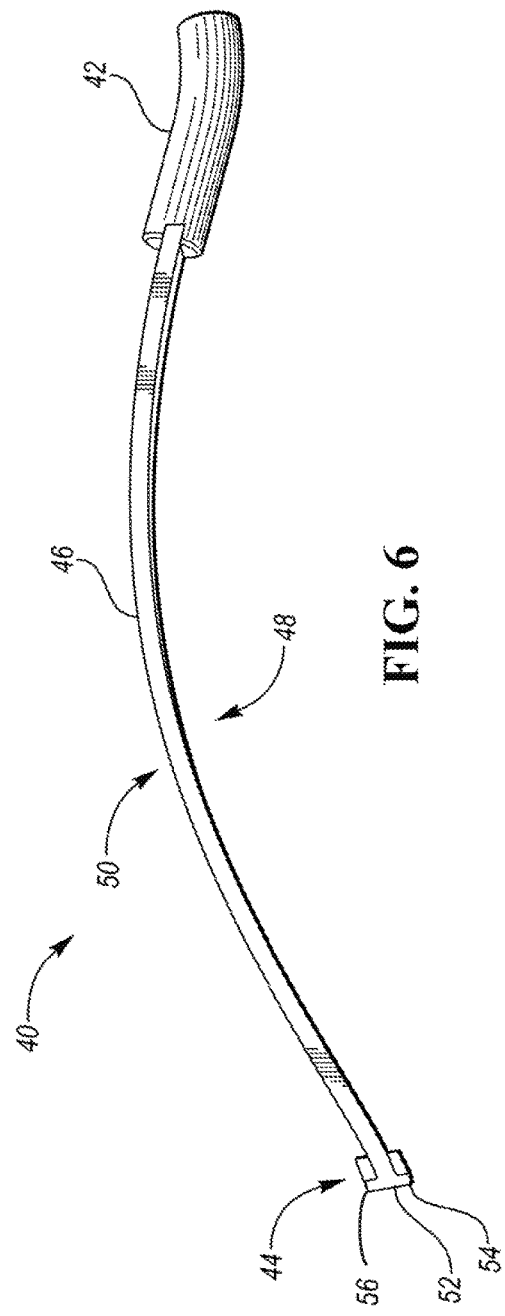
FIG. 6 is a side elevational view of the reaching aid of FIG. 5.

Referring now to FIGS. 5 and 6, the reaching aid 40 includes a handle portion 42, an object engaging portion 44, and an elongated body portion 46 extending in a generally longitudinal direction between the handle portion 42 and the object engaging portion 44. In a preferred approach, one or all portions of the reaching aid 40 are formed polypropylene. Other suitable base materials may be used. Furthermore, other materials may be used in addition to the base material. For example, the elongated body portion 46 may be reinforced with one or more steel components, such as rods. In some approaches, the handle portion 42 and/or the object engaging portion 44 are coated or overlaid with a material such as rubber (e.g., neoprene), elastomers, polymers, powder coating, or any other suitable material. Such materials preferably have an increased coefficient of friction, as compared to polypropylene, for example, to improve user grip or object engagement.

In some approaches, the elongated body portion 46 includes ribs extending along the longitudinal length of the elongated body portion 46. Such ribs allow for a reduction in base material used, while maintaining sufficient stiffness along the elongated body portion 46.

In various approaches, the elongated body portion is an extendable/retractable elongated body portion. For example, the elongated body portion may have telescoping capabilities.

In a preferred approach, as shown in FIG. 6, the elongated body portion 46 has an inner surface contour 48 that substantially matches a surface contour of the trim panel wall. For example, where the reaching aid 40 is intended to be stored in a recess of the back wall 28, the inner surface contour 48 is manufactured to substantially match the surface contour of the back wall 28. In this way, the inner surface contour 48 may be provided with a curvilinear profile, and the surface contour of the trim panel wall may be provided with a matching curvilinear profile. In this way, the inner surface contour 48 is substantially flush with the surface contour of the trim panel wall when in the stored configuration. The elongated body portion 46 also has an outer surface contour 50 that preferably substantially matches the inner surface contour 48.

The handle portion 42 may be a tubular, rounded handle portion and may be provided with ergonomic features. The handle portion 42 may be sized such that, in the stored configuration (e.g., FIG. 3), the handle portion 42 protrudes from the recess beyond the trim panel wall. In this way, the handle portion 42 provides a user with a larger surface area to grasp as compared to the elongated body portion 46.

The object engaging portion 44 may facilitate user engaging an object. For example, a user may desire to pull an object toward the user, push an object away from the user (for example, using a forward face 52 of the object engaging portion 44), or move an object around within the cargo space 14 of the vehicle 10. In a preferred approach, the object engaging portion 44 includes a first protruding ridge 54 extending in a first direction from the inner surface contour 48, and a second protruding ridge 56 extending a second direction from the outer surface contour 50. The first and second protruding ridges 54, 56 are preferable sized to aid a user in moving an object. For example, the first and second protruding ridges 54, 56 may each extend approximately ¼ inch to approximately ½ inch from the inner surface contour 48 and the outer surface contour 50, respectively. Other suitable configurations, such as a hook or a rake configuration, may be implemented at the object engaging portion 44. Still in other approaches, movable components (e.g., articulating arms) may be incorporated in the object engaging portion 44.

As shown in FIG. 5, the object engaging portion 44 may also include a hook or other protrusion 58. The hook 58 preferably extends in a generally lateral direction orthogonal to the generally longitudinal direction of the reaching aid 40. The hook 58 may also aid a user in engaging an object to push, pull, or otherwise move the object.

To mount the reaching aid 40 in a vehicle 10, a user aligns the reaching aid 40 with the recess defined by an indented portion 32 of a wall (e.g., rear wall 28). The user urges the reaching aid within the recess to engage the elongated reaching aid with the recess surface walls. Such engagement creates an interference fit between the indented portion 32 and the reaching aid 40. In a preferred approach, the reaching aid 40 is stored in the recess such that the object engaging portion 44 is disposed in the extended indented portion 32a that defines the extended recess.

The reaching aid 40 is preferably maintained in the recess through an interference fit (e.g., snap-fit, friction-fit, etc.). For example, the elongated body portion 46 is preferably sized to engage the indented portion 32 such that the reaching aid 40 is maintained in the recess defined by the indented portion 32. In another example, the handle portion 42 is sized to engage the indented portion 32 such that the reaching aid 40 is maintained in the recess defined by the indented portion 32. In still another example, the object engaging portion 44 is sized to engage the indented portion 32 (e.g., at an extended indented portion 32a) such that the reaching aid 40 is maintained in the recess defined by the indented portion 32.

In one approach, to remove the reaching aid 40 from the recess, the user presses the reaching aid 40 at an end portion of the reaching aid 40. Preferably, the user presses on the inner surface contour 48 at the object engaging portion 44, thereby forcing the object engaging portion 44 into the extended recess defined by the extended indented portion 32a. Doing so causes the reaching aid 40 to rotate relative to the indented portion 32 such that the handle portion 42 protrudes away from the trim panel wall and into the cargo space 14, thereby facilitating user grip of the handle portion 42.

In other approaches, to remove the reaching aid 40 from the recess, the user pulls on a portion of the reaching aid 40 in the direction of the cargo space 14.

The reaching aid 40 described herein is preferably located such that it is accessible to a user without consuming volume within the cargo space 14. By providing an inner surface contour 48 that substantially matches a surface contour of the trim panel wall, consumed volume is significantly reduced.

Although shown as recessed in the rear wall 28, the reaching aid 40 may be integrated in any suitable location of the vehicle, such as the opposing side walls 22, 24, forward wall 26, or bottom wall 30.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
   trim panel walls defining a cargo compartment, a trim panel wall having an indented portion defining a recess; and
   a reaching aid disposed within the recess in a stored configuration, and selectively removable from the recess, and including an object engaging portion including a first protruding ridge extending in a first direction from an inner surface contour, and a second protruding ridge extending a second direction from an outer surface contour.

2. The vehicle of claim 1, wherein the reaching aid is held within the recess through an interference-fit engagement.

3. The vehicle of claim 1, wherein the reaching aid includes a handle portion, and an elongated body portion extending in a generally longitudinal direction between the handle portion and the object engaging portion.

4. The vehicle of claim 3, wherein the elongated body portion has an inner surface contour substantially matching a surface contour of the trim panel wall, and wherein the inner surface contour is substantially flush with the surface contour of the trim panel wall in the stored configuration.

5. The vehicle of claim 4, wherein the inner surface contour has a curvilinear profile, and wherein the surface contour of the trim panel wall has a matching curvilinear profile.

6. The vehicle of claim 3, wherein the handle portion protrudes from the recess beyond the trim panel wall in the stored configuration.

7. The vehicle of claim 3, wherein the object engaging portion includes a protrusion extending in a generally lateral direction orthogonal to the generally longitudinal direction.

8. The vehicle of claim 1, wherein the reaching aid is at least 10 inches in length.

9. A reaching aid for storage in a trim panel wall of a vehicle, comprising:
   a handle portion;
   an object engaging portion; and
   an elongated body portion extending in a generally longitudinal direction between the handle portion and the object engaging portion, the elongated body portion adapted to form an interference fit with the trim panel wall of the vehicle in a stored configuration, wherein the object engaging portion includes a first protruding ridge extending in a first direction from an inner surface contour, and a second protruding ridge extending a second direction from an outer surface contour.

10. The reaching aid of claim 9, wherein the elongated body portion has an inner surface contour substantially matching a surface contour of the trim panel wall, and wherein the inner surface contour is substantially flush with the surface contour of the trim panel wall in the stored configuration.

11. The reaching aid of claim 10, wherein the inner surface contour has a curvilinear profile, and wherein the surface contour of the trim panel wall has a matching curvilinear profile.

12. The reaching aid of claim 9, wherein the handle portion protrudes beyond the trim panel wall in the stored configuration.

13. The reaching aid of claim 9, wherein the object engaging portion includes a protrusion extending in a generally lateral direction orthogonal to the generally longitudinal direction.

14. A method for handling an elongated reaching aid comprising:
   inserting at least a portion of the elongated reaching aid within an indented portion of a trim panel wall of a vehicle, wherein the elongated reaching aid includes
   a handle portion;
   an object engaging portion; and
   an elongated body portion extending in a generally longitudinal direction between the handle portion and the object engaging portion, the elongated body portion adapted to form an interference fit with the trim panel wall of the vehicle in a stored configuration, wherein the object engaging portion includes a first protruding ridge extending in a first direction from an inner surface contour, and a second protruding ridge extending a second direction from an outer surface contour; and
   engaging the trim panel wall with the elongated reaching aid to provide an interference-fit between the elongated reaching aid and the trim panel wall.

15. The method of claim 14, further comprising:
   pressing at least a portion of the elongated reaching aid into an extended indented portion of the indented portion to rotate the elongated reaching aid relative to the indented portion; and
   removing the elongated reaching aid from the indented portion of the trim panel wall.

\* \* \* \* \*